United States Patent
Dawkins et al.

(10) Patent No.: US 7,060,782 B2
(45) Date of Patent: Jun. 13, 2006

(54) PROCESS FOR A TWO STAGE MELT POLYMERIZATION FOR THE PRODUCTION OF POLYBENZIMIDAZOLE HAVING AN IMPROVED SOLID STATE POLYMERIZATION

(75) Inventors: Bobby G. Dawkins, Charlotte, NC (US); J. Dean Baker, Rock Hill, SC (US); Rita H. Joiner, Rock Hill, SC (US)

(73) Assignee: PBI Performance Products, Inc., Charlotte, NC (US)

( * ) Notice: Subject to any disclaimer, the term of this patent is extended or adjusted under 35 U.S.C. 154(b) by 0 days.

(21) Appl. No.: 10/884,103

(22) Filed: Jul. 2, 2004

(65) Prior Publication Data

US 2006/0004182 A1   Jan. 5, 2006

(51) Int. Cl.
*C08G 69/00* (2006.01)
*C08G 73/18* (2006.01)
*C08F 2/00* (2006.01)

(52) U.S. Cl. .................. 528/327; 528/310; 528/335; 528/336; 528/337; 528/339; 528/340; 528/353; 528/342; 528/348

(58) Field of Classification Search .......... 528/337, 528/353, 310, 327, 335, 336, 339, 340, 342, 528/348
See application file for complete search history.

(56) References Cited

U.S. PATENT DOCUMENTS

| 4,588,808 A * | 5/1986 | Ward ................. 528/337 |
| 4,672,104 A | 6/1987 | Ward |
| 4,717,764 A | 1/1988 | Ward |
| 5,171,829 A * | 12/1992 | Uekita et al. ........... 528/353 |
| 2006/0004181 A1* | 1/2006 | Dawkins et al. ......... 528/327 |
| 2006/0004182 A1* | 1/2006 | Dawkins et al. ......... 528/327 |

* cited by examiner

Primary Examiner—P. Hampton Hightower
(74) Attorney, Agent, or Firm—Hammer & Hanf, P.C.

(57) ABSTRACT

A process for the production of high molecular weight polybenzimidazole by one: providing a first reaction vessel; charging the reaction vessel with at least one aromatic hydrocarbon tetraamine, and a heterocylic ring making up the dicarboxylic component; heating the reactants under agitation in a substantially oxygen-free atmosphere with agitation until the agitator torque is about 1.5 times the torque before a rise in viscosity begins; terminating the agitation while continuing to heat the reaction mixture to about 230° C. while allowing the reaction mass to foam; cooling the reaction mass to a friable foamed mass; crushing the friable foamed mass to obtain a ground prepolymer; and two: providing a second reaction vessel, the second reaction vessel being a high intensity reaction vessel; transferring the ground prepolymer to the second reaction vessel; heating the ground prepolymer under agitation to over 315° C. at atmospheric pressure for a time of about 90 minutes.

21 Claims, No Drawings

PROCESS FOR A TWO STAGE MELT POLYMERIZATION FOR THE PRODUCTION OF POLYBENZIMIDAZOLE HAVING AN IMPROVED SOLID STATE POLYMERIZATION

BACKGROUND OF THE INVENTION

The present invention provides a two-stage melt polymerization process for the production of high molecular weight polybenzimidazoles utilizing certain dicarboxylic compounds as monomers.

Ward U.S. Pat. No. 4,672,104 teaches a two step process for the production of polybenzimidazoles. This two-stage melt polycondensation process has been found to operate with significant variations in product thermal history due reactor design, yielding a product heterogeneous in IV, solubility, solution filtration quality, color, etc. Thus, efforts were initiated to optimize and improve the second stage SSP (solid-state polymerization) reaction equipment and process conditions.

Ward U.S. Pat. No. 4,717,764 teaches a two step process for the production of benzimidazoles/aromatic amide polymers and copolymers and wholly aromatic polyamides.

SUMMARY OF THE INVENTION

Polybenzimidazoles are prepared by reacting in a two stage polymerization process at least one aromatic tetraamine containing two pairs of amine substituents on an aromatic ring, the amine substituents being ortho to one another, and a dicarboxylic component consisting of at least one compound having the formula

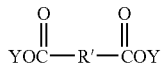

in which R' is a divalent organic radical more specifically defined hereinafter and may be the same or different in the various molecules making up the dicarboxylic component and the Y's may be hydrogen, aryl or alkyl, with no more than 95% of the total Y's in the various molecules making up the dicarboxylic component being hydrogen or phenyl considered separately. Certain of the polybenzimidazoles prepared using the foregoing combinations of monomers are new compositions of matter.

In the first stage of the process, the mixture of aromatic tetraamine and dicarboxylic component is heated to condensation polymerization temperatures which are above the melting point of the aromatic tetraamine. Depending on the nature and melting point of the compound or compounds making up the dicarboxylic component, the resulting polymerizing mass is a liquid which may be a slurry of solid acid particles in melted tetraamine, or a homogeneous mixture of tetraamine and dicarboxylic component and/or an emulsion comprising melted tetraamine and melted dicarboxylic component. The heating is continued to between 230°–350° C. with concurrent strong agitation until the viscosity of the mixture rises to a point such that the agitator torque is above about 1.5 times, and generally no higher than about 6 times, the torque before the increase in viscosity begins to occur. The agitation is then terminated, and heating is continued while allowing the mass to foam to a friable mass. The resulting prepolymer is then cooled and ground to a powder which is transferred to a second reaction vessel having a means for agitation and a means for controlling pressure or vacuum, the second reaction vessel is preferably a high intensity reaction vessel, heating in the solid state in a second polymerization stage in the second reaction vessel at a higher temperature than the first stage until the desired degree of polymerization is achieved.

Alternatively, it has been found that improved results can be obtained in the second stage even without the use of a high intensity reaction vessel by running the solid-state polymerization at a slightly positive pressure.

DETAILED DESCRIPTION OF THE INVENTION

The polybenzimidazoles which can be produced by the process of this invention are those having repeating units of the following formula:

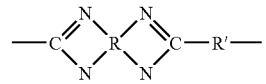

wherein R is a tetravalent aromatic nucleus with the nitrogen atoms forming the benzimidazole rings being paired upon adjacent carbon atoms, i.e., ortho carbon atoms, of the aromatic nucleus, and R' is a member of the class consisting of an aromatic ring; an alkylene group (preferably having 4 to 8 carbon atoms); and a heterocyclic ring such as pyridine, pyrazine, furan, quinoline, thiophene, and pyran. Depending on whether the dicarboxylic acid moieties in the dicarboxylic monomer component are the same or different, R' may be the same or randomly different among the repeating units along the polymer chain. Moreover, depending on whether one or more than one tetraamine monomer is utilized in the polymerization, R may also be the same or randomly different along the polymer chain.

The following generalized equation illustrates the condensation reaction which occurs in forming the polybenzimidazoles having the recurring units of the foregoing formula:

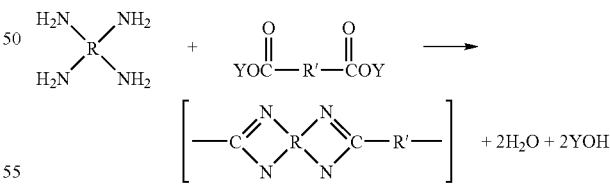

in which R, R' and Y are as previously defined. Such polybenzimidazoles are produced by the reaction of a mixture of (1) at least one aromatic tertraamine containing two groups of amine substituents, the amine substituents in each group being in an ortho position relative to each other, and (2) a dicarboxylic component as indicated in the foregoing equation and as more completely defined hereinafter.

Aromatic tetraamines which may be used, for example, are those with the following formulas:

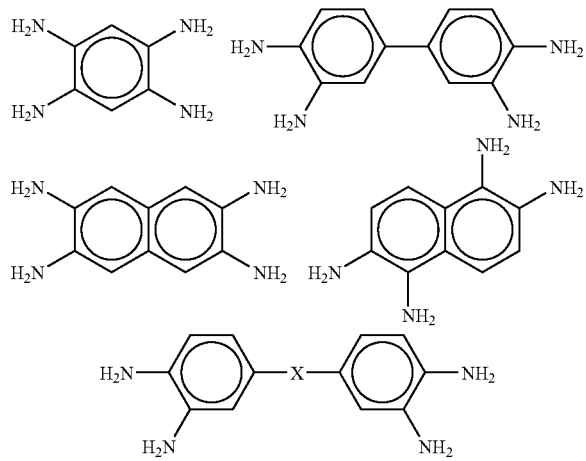

"where X represents ――O――, ――S――, ――SO₂――, ――C――, or a lower alkylene group, such as ――CH2――, ――(CH2)2――, or ――C(CH3)2. Among such aromatic" teteraamines may be mentioned, for example, 1,2,4,5-tetraaminobenzene; 1,2,5,6-tetraaminonaphthalene; 2,3,6,7-tetraaminonaphthalene; 3,3',4,4'-tetraaminodiphenyl methane; 3,3',4,4'-tetraaminodiphenyl ethane; 3,3',4,4'-tetraaminodiphenyl-2,2-propane; 3,3',4,4'-tetraaminodiphenyl thioether; and 3,3',4,4'-tetraaminodiphenyl sulfone. The preferred aromatic tetraamine is 3,3',4,4'-tetraaminobiphenyl.

The compounds which comprise the dicarboxylic component of this invention are defined by the formula:

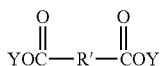

in which the Y's may be hydrogen, aryl or alkyl with no more than 95% of the Y's being hydrogen or phenyl. The dicarboxylic component may therefore consist of a mixture of a free acid with at least one diester and/or monoester; a mixture of diester(s) and/or monoester(s); or a single dialkyl ester, monoester or mixed aryl-alkyl or alkyl/alkyl ester but cannot consist completely of free acid or diphenyl ester. When Y is alkyl, it preferably contains 1 to 5 carbon atoms and is most preferably methyl. When Y is aryl, it may be any monovalent aromatic hydrocarbon group obtained by filling with hydrogen all the valences but one of the aromatic groups which may be R or R' as disclosed previously, either unsubstituted or substituted with any inert monovalent radical such as alkyl or alkoxy containing 1 to 5 carbon atoms. Examples of such aryl groups are phenyl, naphthyl, the three possible phenylphenyl radicals and the three possible tolyl radicals. The preferred aryl group is usually phenyl.

The dicarboxylic acids which are suitable in free or esterified form as part of the dicarboxylic component as previously described for use in the production of polybenzimidazoles by the process of the present invention include aromatic dicarboxylic acids; aliphatic dicarboxylic acids (preferably, those having 4 to 8 carbon atoms); and heterocyclic dicarboxylic acids wherein the carboxylic groups are substituents upon carbon atoms in a ring compound such as pyridine, pyrazine, furan, quinoline, thiophene, and pyran.

The preferred dicarboxylic acids which may be utilized in free or esterified form as described are aromatic dicarboxylic acids such as those illustrated below:

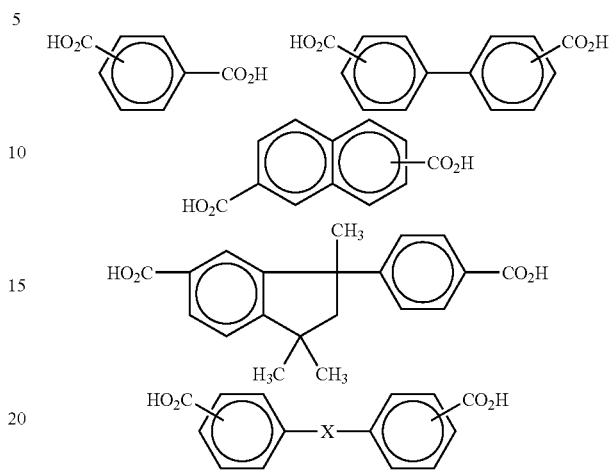

where X is as defined above. For example, the following diacids can suitably be employed: isophthalic acid; terephthalic acid; 4,4'-biphenydicarboxylic acid; 1,4-naphthalenedicarboxylic acid; diphenic acid (2,2'-biphenyldicarboxylic acid); phenylindandicarboxylic acid; 1,6-napthalenedicarboxylic acid; 2,6-naphthalenedicarboxylic acid; 4,4'-diphenyletherdicarboxylic acid; 4,4'-diphenylsulfonedicarboxylic acid; 4,4'-diphenylthioetherdicarboxylic acid. Isophthalic acid is the dicarboxylic acid which in free or esterified form, or diphenyl isophthalate (1,3-benzene dicarboxylic acid, diphenyl ester) are the most preferred for use in the process of the present invention.

Preferably the dicarboxylic component is one of the following combinations: (1) at least one free dicarboxylic acid and at least one diphenyl ester of a dicarboxylic acid; (2) at least one free dicarboxylic acid and at least one dialkyl ester of a dicarboxylic acid, and (3) at least one diphenyl ester of a dicarboxylic acid and at least one dialkyl ester of a dicarboxylic; and (4) at least one dialkyl ester of a dicarboxylic acid. The dicarboxylic moieties of the compounds of each combination may be the same or different and the alkyl groups of the alkyl esters of combinations (2), (3) and (4) generally contain 1 to 5 carbon atoms and are most preferably methyl.

It is preferred to employ the dicarboxylic component in a ratio of about 1 mole of total dicarboxylic component per mole of aromatic tetraamine. However, the optimal ratio of reactants in a particular polymerization system can be easily determined by one of ordinary skill in the art.

Examples of polybenzimidazoles which may be prepared according to the process of the present invention include:
poly-2,2'-(m-phenylene)-5,5'-bibenzimidazole;
poly-2,2'-(biphenylene-2"2''')-5,5'-bibenzimidazole,
poly-2,2'-(biphenylene-4"4''')-5,5'-bibenzimidazole;
poly-2,2'-(1",1",3"trimethylindanylene-3"5"-p-phenylene-5,5'-bibenzimidazole;
2,2'-(m-phenylene)-5,5'-bibenzimidazole/2,2-(1",1",3"-trimethylindanylene) 5",3"-(p-phenylene) -5,5'-bibenzimidazole copolymer;
2,2'-(m-phenylene)-5,5-bibenzimidazole/2,2'-biphenylene-2",2''')-5,5'-bibenzimidazole copolymer;
poly-2,2'-(furylene-2",5")-5,5'-bibenzimidazole;
poly-2,2'-(naphthalene-1",6")-5,5'-bibenzimidazole;

poly-2,2'-(naphthalene-2",6")-5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) sulfone;
poly-2,2'-(m-phenylene)-5,5'-di(benzimidazole) methane;
poly-2,2"-(m-phenylene)-5,5"-di(benzimidazole) propane-2,2; and
poly-ethylene-1,2-2,2"-(m-phenylene)-5,5"-dibenzimidazole) ethylene-1,2 where the double bonds of the ethylene groups are intact in the final polymer.

The preferred polybenzimidazole prepared by the process of the present invention is poly-2,2'-(m-phenylene)-5,5'-bibenzimidazole, the recurring unit of which is: where n is an integer in excess of 75. This polymer can be prepared in accordance with the process of the present invention by the reaction of 3,3',4,4'-tetraaminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

The process of the invention may be used to produce polybenzimidazoles of one or more aromatic tetraamines and one or more dicarboxylic acids. In general, stoichiometric quantities of the total tetraamine and dicarboxylic component are utilized, or a slight molar excess of the dicarboxylic component.

Inherent viscosity (hereinafter "IV") is the ratio of the specific viscosity of a solution of known concentration to the concentration of solute extrapolated to zero concentration, measured in units of dL/g. Inherent or intrinsic viscosity is also called the limiting viscosity number. It is directly proportional to the polymer-average molecular weight. dL/g, IV (inherent viscosity) measure, is based on the concentration of the polymer sample tested, g/100 ml or g/deciliter. The polymer is dissolved at the 0.4% (w/v) level in 100 ml of 96.5% (+/−0.5%) sulfuric acid at 80° C. After filtering, an aliquot is measured for IV using a calibrated Cannon-Fenske capillary viscometer in a 25+/−0.1 C water bath, the flow time (sec.) of the PBI polymer solution measured vs. the dissolving solvent. IV=ln (t1/t2)/c, where the natural log of the flow time of the PBI solution (t1) over the flow time of the solvent (t2) is divided by the PBI solution concentration.

The first stage of the process of the invention is carried out by heating the aromatic tetraamine, dicarboxylic component, with strong agitation to a temperature in the range of 230°–350° C. and preferably 280°–340° C. in the first reaction vessel. Depending on the melting point of the compounds of the dicarboxylic component and the chemical nature of the tetraamine and the dicarboxylic component, the liquid mass being agitated will be a slurry, a homogenous mixture or an emulsion of two immiscible liquids. When the viscosity of the reacting mass begins to rise as indicated by increased torque on the agitator manifested by increased energy of agitation, the agitation is discontinued and the mass heated further and allowed to foam. The point at which the agitation is discontinued is generally such that the agitator torque and energy of agitation has not risen above, for example, about 1000% of the initial torque or agitation energy after the tetraamine has melted, preferably not above about 300% such initial torque or agitation energy. The mass is then heated further without agitation to a temperature in the range, for example, of about 230° to 350° C., preferably about 280° to 340° C. Such heating is continued for a period of time in the range, for example, of about 0.25 to 3 hours and preferably about 0.5 to 1.5 hours. The foamed mass is then cooled to a temperature below its melting point, e.g. room temperature which causes it to set up into a solid friable mass which is easily crushed or ground. This cooling step can generally take the reaction mass to between 35° C. to 15° C., while it is preferred to cool to room temperature which is considered to be between or equal to 20° to 25° C. In general, the inherent viscosity of the prepolymer after the first stage is complete is in the range, for example, of about 0.05 to 0.3 dl/g, (All inherent viscosities were measured from a solution of 0.4% by weight of polymer in 96.5% sulfuric acid at 25° C.).

The ground prepolymer is then transferred to a second high intensity reaction vessel. A high intensity reaction vessel has a means for agitation, a means to control temperature and a means for controlling pressure or vacuum. What sets this vessel apart from the vessel used in the first stage of the reaction is the means for agitation tends to be more robust and is capable of agitating the ground prepolymer in a solid state. These high intensity reactors include but are not limited to, rotary furnace, fluidized bed, static mixing, agitated autoclave or glassware, continuous kneader reactor, opposite rotating processor, same direction rotating processors and a single shaft rotating processor. These high intensity mixers can be obtained from various sources which include but are not limited to: Komax Systems Inc., Wilmington, Calif.; Koch-Glitsch, Wichita, Kans.; Carbolite, Watertown, Wis.; LIST Charlotte, N.C.; Processall, Cinncinnati, Ohio; Procedyne Corp., New Brunswick, N.J. Further, it is possible to convert a standard mixing vessel to a high intensity reaction vessel by changing the agitator blades to engage most of the mixture, using a larger or more powerful agitator motor, adding additional agitators or combinations thereof.

Through use of the high intensity mixer, compared to the current commercial manufacturing process, the Solid State Polymerization process and product data/results indicate improved IV uniformity and higher IV target capability with the higher commercial manufacturing temperature capability (up to 400° C.), with reduced reaction times, or conversely, the ability to meet product IV targets at lower process temperatures (335° C. vs. 345°–370° C.). This gives additional flexibility in being able to use temperature to regulate the desired IV target. Surprisingly the plugging values for the resulting product have been running much higher than the current commercial product.

During the second step after transferring the ground prepolymer to the second reaction vessel, the ground prepolymer is heated under agitation to between 315° to 400° C. and preferably to between 330° to 400° C. If IV target is under 1.0 dL/g than a temperature of between 330° to 350° C. can be used. For IV in excess of 1.0 dL/g than a temperature of between 355° to 400° C. are preferable. In heating the ground prepolymer under agitation a slight positive pressure is applied, this slight positive pressure can be atmospheric pressure or it is between or equal to 2 mbar to 30 mbar or between 0.25 inches of $H_2O$ to 5 inches of $H_2O$ or 0.63 cm of $H_2O$ to 13 cm of $H_2O$. The ground prepolymer is heated for a time between 90 minutes and 400 minutes, preferably between 200 and 360 minutes or between 220 to 330 minutes.

Polybenzimidazoles are used for different purposes based on the particle size. Polybenzimidazoles having an average particle size (PS) of less than 150 microns are generally used commercially as polymers and need to have a minimum inherent viscosity of 0.5. For production of extruded fibers and extruded films it is better to have larger particles generally 300 microns or more having an inherent viscosity (IV) of about 0.8 or more. For use with fuel cell membranes the larger particles are used, in excess of 300 microns in size, and inherent viscosity needs to be 0.9 or better, preferably 1.1.

In both stages of the process of the present invention, a pressure is employed preferably equal to at least atmospheric pressure, e.g., one to two atmospheres, and preferably atmospheric pressure. Such a pressure is commonly obtained by employing an open polymerization system provided with a condenser in order to remove the condensate compounds which are produced as by-products of the reaction.

Both stages of the process are conducted in a substantially oxygen-free atmosphere. For example, an inert gas such as nitrogen or argon can be continuously passed through the reaction zone during the polymerization. The inert gas employed should be substantially oxygen-free, i.e., contain less than about 20 ppm (parts per million) of oxygen, preferably less than about 8 ppm, and more preferably, be oxygen-free. The inert gas is introduced into the reaction zone at a rate of flow measured at standard conditions, that is, atmospheric pressure and temperature, within the range of about 1 to 200 percent of the volume of the reaction zone per minute. The inert gas can be passed into the polymerization reaction zone at room temperature or, if desired, preheated to the reaction temperature. One way to achieve a substantially oxygen-free atmosphere is to pump $N_2$ into the reaction chamber at a rate of between 0.6 standard liters per minute (SLPM) to 4.6 SLPM. In the first stage the reactants can be also be places under a slight vacuum general between 10 cm to 46 cm of Hg.

The process of the present invention can be used to produce a high molecular weight polybenzimidazole product as indicated by relatively high inherent viscosity. Such products exhibit an inherent viscosity for particles in the range of 300 to 1000 microns in size, of at least about 0.6 dl/g when measured at a concentration of 0.4 g. of the polymer in 100 ml. of 96.5 percent $H_2SO_4$ at 25° C. Preferably, the polymer exhibits an inherent viscosity of at least about 0.8 dl/g, and the inherent viscosity is most preferably at least about 1.0 dl/g.

Using the process of the present invention it is possible to achieve average inherent viscosities of at least 0.6 dL/g for all particles in the size range of greater than or equal to 150 microns and smaller than or equal to 1000 microns. This can be achieved in a two stage process. Starting with the first stage, a first reaction vessel is provided having a means for agitation and a means for controlling atmosphere. Then the reaction vessel is charged with at least one aromatic hydrocarbon tetraamine containing two pairs of amine substituents on an aromatic ring in ortho position and dicarboxylic component consisting of at least one compound having the formula:

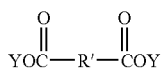

in which R' is a divalent organic radical of the class consisting of an aromatic hydrocarbon ring, an alkylene group, and a heterocylic ring and may be the same or different in the various molecules making up the dicarboxylic component and the Y's may be hydrogen, aryl or alkyl with no more than 95% of the Y's being hydrogen or phenyl to create a reaction mass. A vacuum is then pulled between 10 cms of Hg to 46 cms of Hg, and the reactants are heated under agitation in a substantially oxygen-free atmosphere with agitation until the agitator torque is from about 1.5 to about 6 times the torque before a rise in viscosity begins. At this point the agitation is terminated while continuing to heat the reaction mixture to a temperature of from 230 degree to 350 degree C. while allowing the reaction mass to foam. The reaction mass is cooled to a fiable foamed mass which is subsequently crushed to obtain a ground prepolymer. Starting the second stage, a second reaction vessel is provided having a means for agitation and a means for controlling pressure or vacuum, and transferring the ground prepolymer to the second reaction vessel. The ground prepolymer is heated under agitation to between 315° to 400° C. at a slight positive pressure for a time between 90 minutes and 400 minutes. The current commercial process requires generally that the ground prepolymer be heated to temperatures above 350° C. to get IV's of in excess of 0.6 dL/g. However the plugging values are usually consistently below 6 g/cm², where in many cases values tend to be down below 3 g/cm². Surprisingly with the present invention, it is possible to achieve average inherent viscosities of at least 0.7 dL/g for all particles in the size range of greater than or equal to 150 microns and smaller than or equal to 1000 microns where the ground prepolymer is heated to a range of between or equal to 330° to 350° and still achieve plugging values greater than or equal to 10 g/cm². With the present invention by raising the reaction temperature to between 355–400° C. it is possible to achieve average inherent viscosities of at least 1.0 dL/g for all particles in the size range of greater than or equal to 150 microns and smaller than or equal to 1000 microns and still achieve plugging values of 10 and greater.

The following examples further illustrate the invention. The inherent viscosities (IV) mentioned in the examples were measured as a 0.4% solution in 96.5% concentrated sulfuric acid at 25° C. while the plugging values (PV, a solubility/filterability measure, vital for defining subsequent polymer solution quality and subsequent fiber and film extrusion ability and quality) were measured by forming a 5% solution of the polymer in 96.5% sulfiric acid or a 6% solution in dimethyl acetamide containing 2% lithium chloride and filtering the solution at 25° C. and one atmosphere pressure through a Gelman Type A glass paper filter. The plugging value, which is the number of grams of polymer solution filtered per unit area in infinite time, is expressed in grams of polymer per square centimeter. A higher value indicates a polymer solution containing less gels and insolubles. Gels are defined in this process as insoluble, deformable, polymer-like particles, most likely degraded or cross-linked polymer.

An SSP trial demonstrated the preparation of PBI polymer of a range of IV's, 0.5–1.1 dl/g, pending the second stage reaction temperature and time. Final polymer product characteristics—including color, PV, "gel" level, particle size distribution, density—are potentially influenced by other factors, such as monomer stoichiometry, exposure to oxygen, vacuum/pressure/atmospheric conditions, agitation rate, phenol level, and monomer purity (particularly a tetraaminiobiphenyl (TAB)).

Prior rotary reactor furnace bench-scale trials explored how SSP is impacted by first stage stoichiometry (with and without excess of the diphenyl isophthalate (DPIP)), nitrogen gas flow rate, temperature (350°–380° C.), and first stage prepolymer particle size. Feasibility was demonstrated for preparing gel-free polymer with predetermined IV, pending the proper choice of prepolymer stoichiometry, particle size, and polymerization temperature and time.

The first stage raw materials were prepared using the commercial process, ie, with a 0.6% molar excess of the DPIP monomer. The excess DPIP reduces the potential for free TAB, and DPIP can potentially distill out of the reactor with liberated phenol. With reactor agitation, the polymer particles would be expected to decrease, product uniformity expected to increase, and IV growth dependent on the particle size. Smaller-size particles do not advance as much in the second stage (see IV vs. particle size distribution data for the <300 micron particle size range), but prepolymer grinding (such as pinmilling) would be expected to promote better heat transfer and particle size control, particularly for the 100-mesh product (<150 microns), but not for the high IV product. While smaller particles provide for better/more uniform heat transfer, the reduced surface area apparently contributes to more difficult phenol and water removal, and subsequently diminished IV growth. Low-IV, larger-sized, particles may result from poor heat transfer. The IV appears to advance according to the IV and size of the individual particles, polymerizing into various molecular-weight species with thermal history predominantly. Longer reaction times at higher temperatures have been found to increase IV, but will eventually decrease PV without controls.

For the high IV fuel cell grade polymer, non-LiCl solutioning would be rendered easier with small particle sizes, ie, <500 microns at 1.1 IV minimum. Furthermore, the higher the IV (>1.2) the better the mechanical stability of resulting films, as prepared and with aging. The desire IV and particle size can be segregated/sieved based on the IV vs. PSD data, or the final products made to the desired target IV and particle size, or range.

Other non-routine polymer characterization and quality testing included the following for direct comparison with the commercial product:

The gel level was determined by preparing a 0.4% (w/v) solution of the polymer in 97% sulfuric acid in a stoppered bottle by stirring at room temperature for 48 hours. The solution was filtered through a sintered glass crucible (ASTM type 10–15 micron). The insoluble portion was washed with ammonia solution followed by water and dried under vacuum at 140° C. for 8 hours; the gel content was determined gravimetrically. Negligible gel level is indicative of negligible insolubles and good solution quality.

Polymer samples for gel permeation chromatography (GPC) analyses were prepared by charging 5 mg sample and 20 ml of 0.05N lithium chloride (LiCl) in dimethyl acetamide (DMAc) into a Parr reactor. After tightly closing, the reactor is placed into an oil bath and the temperature is maintained at 180° C. for 12 hours. The solution is filtered through a 0.2 micron syringe filter prior to injecting an 100 microliter aliquot onto a GPC column (PSS polyolefin linear XL). The GPC separation is conducted with 0.05N LiCl in DMAc eluent, 1 ml/min flow rate, 65° C., 4.7 MPa pressure, refractive index detection, and vs. PMMA (polymethyl methacrylate) broad molecular weight distributions (MWD) polymer standards. The narrow MWD's (target <3.0 polydispersities) in the SSP trial products illustrated in the process examples were directionally consistent with the narrow molecular weight's (MW's/IV's) targeted for improved extrusion/spinning performance and the mechanical properties required for extruded films and membranes.

Polymer solutions for nuclear magnetic resonance (NMR) were prepared by weighing 3–4 mg sample into a glass reaction vial and adding 1 ml of 96% deuterated sulfuric acid. The capped vial was shaken for 2 days at room temperature to affect complete solutioning. Proton NMR spectral scans were obtained using a Varian Unity 300 spectrometer.

Test results were found to be typical of, or exceeding, the normal commercial product.

EXAMPLES

Control Samples for Test Comparisons

Control samples were taken from three batchers produced at the commercial process. These batches were selected to encompass the IV range of 0.74 to 1.10 in order to compare trial data to normal commercial production. However in order to produce these commercial batches in this IV range the current production had to be run at higher temperatures with longer reaction times for the higher IV range. The samples were normal commercial production samples and therefore represent polymer that has been sieved to remove 100-mesh particles (<150-micron): batches 1-120/2-119-02PM, 1-121-02, and 2-112-02, they are identified in the table as Control A, Control B, and Control C.

The first stage polymer from batch 137-02 was prepared using the current commercial reaction vessels and utilizing a normal first stage process. After crushing the product, the vessel was ramped to 290° C. for a 75-minute hold time. The vessel was cooled and the polymer discharged from the reactor for second staging. The first stage from batch 138-02 was prepared similarly, except for a 90-minute hold time at 290° C. "Hold" time is processing time added early in the reaction sequence, after the typical first-stage reaction, to promote phenol condensate removal, but without negatively impacting the polymer reaction. Added processing time in the typical subsequent second-stage reaction, and at a higher temperature, could promote cross-linking, thus hindering IV or molecular weight growth. Polymer solubility and filtration quality would be positively impacted with the earlier "hold time", or via a single-stage process.

Trial Samples

Example J1, 13.34 lbs. from batch 1-093-02 charged to LIST CRP-10 Batch, twin shaft, vessel at 209° C.; vessel pressure of 16 mbar g; agitation at 16 rpm; $N_2$ flow of 3 SCFH (standard cubic feet per hour) at standard temperature (0° C.) and pressure (1 atm) or 1.42 SLPM (standard liters per minute); ramped to 325° C. target at 137° C./hr; total polymerization time of 240 minutes from 320° C. measured; then samples where taken.

Example J2 9.99 lbs. (centercut, ie, >50-mesh or >300 microns particle size) from 1-093-02 charged at ambient temperature; same agitation, $N_2$ flow, and pressure as above; ramped to 343° C. target at 172° C./hr; total polymerization time of 240 minutes from 330° C. measured; same sampling scheme as above.

Example J3: 9.99 lbs. from batch 1-093-02 charged to vessel at ambient temperature; same agitation, $N_2$ flow, and pressure as above; ramped to 343° C. target at 83° C./hr (due to heater malfunction, the product remained at 130 C for 40 minutes); total polymerization time of 300 minutes from 330° C.; then samples where taken.

Example O1: 5.7 lbs. from batch 1-137-02 charged to LIST 6.3 Batch, single shaft, vessel at 200° C.; pressure at 2 inches H₂O positive (5.1 cms H₂O positive); 20 rpm agitation; 3 SCFH (standard cubic feet per hour) at standard temperature (0° C.) and pressure (1 atm) or 1.42 SLPM (standard liters per minute) N₂ flow; ramped to 328° C. target at 141° C./hr; total polymerization time of 255 minutes from 312° C. measured; then samples where taken.

Example O2: 5.7 lbs. from batch 1-138-02 charged to vessel at ambient temperature; pressure maintained at 2 inches H₂O positive (5.1 cm H₂O positive); agitator at 20 rpm; N₂ flow at 3 SCFH (standard cubic feet per hour) at standard temperature (0° C.) and pressure (1 atm) or 1.42 SLPM (standard liters per minute); ramped to 328° C. target at 122° C./hr; total polymerization time of 300 min. from 312° C. measured; then samples where taken.

Example O3: 5.7 lbs. from batch 1-137-02 charged to vessel at ambient temperature; same conditions as above for agitation, pressure, and N₂ flow; ramped to 338° C. target at 132° C./hr; total polymerization time of 300 minutes from 323° C. measured; then samples where taken.

Example O4: 5.7 lbs. from batch 1-138-02 charged to vessel at ambient temperature; same conditions as above for agitation, pressure, and N₂ flow; ramped to 338° C. target at 149° C./hr; total polymerization time of 300 minutes from 323° C. measured; then samples where taken.

Both the control samples and the Examples were checked for final polymer product characteristics including: for IV (and IV vs. particle size distribution), PV (plugging value, or filterability), L color, gel level, and by GPC (Gel Permeation Chromatography) for molecular weight distribution and NMR (Nuclear Magnetic Resonance) spectroscopy.

Gels are defined in this process as insoluble, deformable, polymer-like particles, most likely degraded or cross-linked polymer. PV is a solubility/filterability measure, vital for defining solution quality and subsequent fiber extrusion ability and quality. "L" color refers to the color level relative to whiteness on the color scale, the higher the value, the lighter color appearance. NMR, or nuclear magnetic resonance is useful to monitor the molecular structure of the products. Polymer samples and products were tested by these other methods to further characterize the polymer produced, the chemical and physical properties, and to further characterize the products as polybenzimidazole.

The IV (and IV vs. particle size distribution, PSD), and PV are given below. The L color, gel level, and by GPC (Gel Permeation Chromatography) for molecular weight distribution and NMR (Nuclear Magnetic Resonance) spectroscopy while not specifically listed were deemed to be acceptable judged by the current standards.

SSP Trial Test Data:

| SAMPLE | | PSD: WT (GM) | WT (%) | IV | PV |
|---|---|---|---|---|---|
| J1 | DAY 1 | | | 0.64 | 15.6 |
| | PS, microns | | | | |
| | >1000 | 1.68 | 3.33 | 0.85 | |
| | 1000–710 | 3.11 | 6.17 | 0.98 | |
| | 710–425 | 10.28 | 20.39 | 0.93 | |
| | 425–300 | 9.09 | 19.56 | 0.84 | |
| | 300–150 | 15.59 | 30.92 | 0.65 | |
| | <150 | 9.9 | 19.64 | 0.49 | |
| J2 | DAY 2 | | | 0.93 | 10.7 |
| | >1000 | 3.08 | 4.09 | 0.99 | |
| | 1000–710 | 6.97 | 9.25 | 1.07 | |
| | 710–425 | 25.3 | 33.57 | 1.03 | |
| | 425–300 | 22.52 | 29.88 | 0.93 | |
| | 300–150 | 15.74 | 20.88 | 0.84 | |
| | <150 | 1.76 | 2.34 | 0.61 | |
| J3 | DAY 3 | | | 0.96 | 15.4 |
| | >1000 | 0.94 | 1.25 | 0.96 | |
| | 1000–710 | 2.14 | 2.84 | 1.13 | |
| | 710–425 | 11.18 | 14.84 | 1.1 | |
| | 425–300 | 13.03 | 17.29 | 1.09 | |
| | 300–150 | 28.47 | 37.78 | 0.75 | |
| | <150 | 19.6 | 26.01 | 0.55 | |
| O1 | DAY 1 | | | 0.61 | 16.3 |
| | >1000 | 3.59 | 4 | 0.83 | |
| | 1000–710 | 7.87 | 8 | 0.86 | |
| | 710–425 | 21.16 | 21 | 0.84 | |
| | 425–300 | 15.36 | 15 | 0.8 | |
| | 300–150 | 30.05 | 30 | 0.63 | |
| | <150 | 21.95 | 22 | 0.48 | |
| O2 | DAY 2 | | | 0.53 | 20.8 |
| | >1000 | 3.47 | 3 | 0.74 | |
| | 1000–710 | 6.77 | 7 | 0.76 | |
| | 710–425 | 18.76 | 19 | 0.81 | |
| | 425–300 | 11.98 | 12 | 0.84 | |
| | 300–150 | 27.3 | 27 | 0.64 | |
| | <150 | 31.98 | 32 | 0.44 | |
| O3 | DAY 3 | | | 0.58 | 12.1 |
| | >1000 | 5.51 | 6 | 0.94 | |
| | 1000–710 | 9.23 | 9 | 0.92 | |
| | 710–425 | 21.82 | 22 | 0.83 | |
| | 425–300 | 16.42 | 16 | 0.93 | |
| | 300–150 | 27.52 | 28 | 0.7 | |
| | <150 | 20.07 | 20 | 0.52 | |
| O4 | DAY 4 | | | 0.7 | 13.9 |
| | >1000 | 3.41 | 3 | 0.82 | |
| | 1000–710 | 7.73 | 8 | 0.89 | |
| | 710–425 | 20.27 | 20 | 0.93 | |
| | 425–300 | 10.91 | 11 | 0.89 | |
| | 300–150 | 30.35 | 30 | 0.74 | |
| | <150 | 27.53 | 28 | 0.53 | |
| Control A | | | | 0.74 | 0.6 |
| | >1000 | 3.4 | 3 | 0.6 | |
| | 1000–710 | 3.23 | 3 | 0.73 | |
| | 710–425 | 8.42 | 8 | 0.9 | |
| | 425–300 | 11.54 | 11 | 0.9 | |
| | 300–150 | 57.7 | 57 | 0.77 | |
| | <150 | 16.29 | 16 | 0.64 | |
| Control B | | | | 0.91 | 5.1 |
| | >1000 | 7.97 | | 1.06 | |
| | 1000–710 | 6.39 | | 1.1 | |
| | 710–425 | 11.15 | | 1.12 | |
| | 425–300 | 8.76 | | 0.97 | |
| | 300–150 | 23.88 | | 0.79 | |
| | <150 | 3.85 | | 0.61 | |
| Control C | | | | 1.01 | 14.9 |
| | >1000 | 3.02 | | 1.27 | |
| | 1000–710 | 3.62 | | 1.35 | |
| | 710–425 | 9.39 | | 1.39 | |
| | 425–300 | 8.68 | | 1.16 | |
| | 300–150 | 20.39 | | 0.92 | |
| | <150 | 5.23 | | 0.67 | |

The invention claimed is:

1. A process for a two stage melt polymerization for the production of polybenzimidazole in a first stage and in a second stage which comprises the first stage steps of:
providing a first reaction vessel having a means for agitation and a means for controlling atmosphere;
charging said reaction vessel having a means for agitation and a means for controlling atmosphere;
charging said reaction vessel with at least one aromatic hydrocarbon tetraamine containing two pairs of amine substituents on an aromatic ring in ortho position and a dicarboxylic component consisting of at least one compound having the formula:

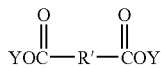

In which R' is a divalent organic radical of the class consisting of an aromatic hydrocarbon ring, an alkylene group, and a heterocyclic ring and may be the same or different in the various molecules making up the dicarboxylic component and tye Y's may be hydrogen, aryl or alkyl with no more than 95% of the Y's being hydrogen or phenyl to create a reaction mass;
  Heating said reactants under agitation in a substantially oxygen-free atmosphere with agitation until the agitator torque is from abut 1.5 to about 6 times the torque before a rise in viscosity begins;
  Terminating the agitation while continuing to heat the reaction mixture to a temperature of from 230 degree to 350 degree C. while allowing said reaction mass to foam;
  cooling said reaction mass to a friable foamed mass;
  crushing said friable foamed mass to obtain a ground prepolymer; and starting the second stage which comprisies the steps of:
  agitation and a means for controlling pressure or vacuum, said second reaction vessel being a high intensity reaction vessel;
  transferring said ground prepolymer to said second reaction vessel;
  heating said ground prepolymer under agitation to between 315° to 400° at atmospheric pressure for a time between 90 minutes and 400 minutes.

2. The process for a two stage melt polymerization for the production of polybenzimidazole according to claim 1 where, in the second stage, the heating and agitating step is performed at a slight positive pressure.

3. The proeess for a two stage melt polymerization for the production of polybenzimidazole according to claim 2 where, in the second stage, where said slight positive pressure is between or equal to 2 mbar to 30 mbar.

4. The process for a two stage melt polymerization for the production of polybenzimidazole according to claim 2 where, in the second stage, where said slight positive pressure is equal to or between 0.25 inches of $H_2O$ to 5 inches of $H_2O$ or 0.63 cm of $H_2O$ to 13 cm of $H_2O$.

5. The process for a two stage melt polymerization for the production of polybenzimidazole according to claim 2 where, in the second stage, where said heating is performed for between 200 minutes to 320 minutes.

6. The process for a two stage melt polymerization for the production of polybenzimidazole according to claim 1 where, in the second stage, heating said ground prepolymer under agitation to between 330° to 350° C. at a slight positive pressure for a time between 220 minutes and 330 minutes to produce said polybenzimidazele having an average inherent viscosity of at least 0.7 dL/g for all particles in the size range of greater than or equal to 150 microns and smaller than or equal to 1000 microns.

7. The process for a two stage melt polymerization for the production of polybenzimidazole according to claim 6 where, said polybenzimidazole has a plugging value greater than or equal to 10 g/cm².

8. A process for a two stage melt polymerization for the production of polybenzimidazole in a first stage and in a second stage which comprises the first stage steps of:
  providing a first reaction vessel having a means for agitation and a means for controlling atmosphere;
  charging said reaction vessel with at least one aromatic hydrocarbon tetraamine containing two pairs of amine substituents on an aromatic ring in ortho position and dicarboxylic component consisting of at least one compound having the formula:

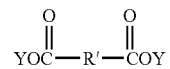

in which R' is a divalent organic radical of the class consisting of an aromatic hydrocarbon ring, an alkylene group, and a heterocylic ring and may be the same or different in the various molecules making up the dicarboxylic component and the Y's may be hydrogen, aryl or alkyl with no more than 95% of the Y's being hydrogen or phenyl to create a reaction mass;
  pulling a vacuum of between of between 10 cm of Hg to 46 cm of Hg;
  heating said reactants under agitation in a substantially oxygen-free atmosphere with agitation until the agitator torque is from about 1.5 to about 6 times the torque before a rise in viscosity begins;
  terminating the agitation while continuing to heat the reaction mixture to a temperature of from 230 degree to 350 degree C. while allowing said reaction mass to foam;
  cooling said reaction mass to a friable foamed mass;
  crushing said friable foamed mass to obtain a ground prepolymer; and starting the second stage which comprises the steps of:
  providing a reaction vessel having a means for agitation and a means for controlling pressure or vacuum;
  transferring said ground prepolymer to said reaction vessel;
  heating said ground prepolymer under agitation to between 315° to 400° C. at a slight positive pressure for a time between 90 minutes and 400 minutes.

9. The process for a two stage melt polymerization for the production of polybenzimidazole according to claim 8 where, in the second stage, where said slight positive pressure is between or equal to 2 mbar to 30 mbar.

10. The process for a two stage melt polymerization for the production of polybenzimidazole according to claim 8 where, in the second stage, where said slight positive pressure is equal to or between 0.25 inches of $H_2O$ to 5 inches of $H_2O$ or 0.63 cm of $H_2O$ to 13 cm of $H_2O$.

11. The process for a two stage melt polymerization for the production of polybenzimidazole according to claim 8 where, in the second stage, where said heating is performed for between 200 minutes to 320 minutes.

12. The process for a two stage melt polymerization for the production of polybenzimidazole according to claim 8 where, in the second stage, heating said ground prepolymer under agitation to between 330 to 350° C. at a slight positive pressure for a time between 220 minutes and 330 minutes to produce a polybenzimidazole having an average inherent viscosity of at least 0.7 dL/g for all particles in the size range of greater than or equal to 150 microns and smaller than or equal to 1000 microns.

13. The process for a two stage melt polymerization for the production of polybenzimidazole according to claim 12 where said polybenzimidazole has a plugging value greater than or equal to 10 g/cm².

14. The process for a two stage melt polymerization for the production of polybenzimidazole according to claim 8 where, in the second stage, heating said ground prepolymer under agitation to between 355° to 400° C. at a slight positive pressure for a time between 200 minutes and 360 minutes to produce a polybenzimidazole having an average inherent viscosity of at least 1.0 dL/g for all particles in the size range of greater than or equal to 150 microns and smaller than or equal to 1000 microns.

15. The process for a two stage melt polymerization for the production of polybenzimidazole according to claim 14 where said polybenzimidazole has a plugging value greater than or equal to 10 g/cm².

16. A process for a two stage melt polymerization for the production of polybenzimidazole in a first stage and in a second stage which comprises the first stage steps of:
providing a first reaction vessel having a means for agitation and a means for controlling atmosphere;
charging said reaction vessel with at least one aromatic hydrocarbon tetraamine containing two pairs of amine substituents on an aromatic ring in ortho position and dicarboxylic component consisting of at least one compound having the formula:

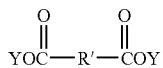

in which R' is a divalent organic radical of the class consisting of an aromatic hydrocarbon ring, an alkylene group, and a heterocylic ring and may be the same or different in the various molecules making up the dicarboxylic component and the Y's may be hydrogen, aryl or alkyl with no more than 95% of the Y's being hydrogen or phenyl to create a reaction mass;
pulling a vacuum of between of between 10 cm of Hg to 46 cm of Hg;
heating said reactants under agitation in a substantially oxygen-free atmosphere with agitation until the agitator torque is from about 1.5 to about 6 times the torque before a rise in viscosity begins where said substantially oxygen-free atmosphere comprises a $N_2$ flow of between 0.6 SLPM to 4.6 SLPM, containing less than 20 parts per million oxygen;
terminating the agitation while continuing to heat the reaction minture to a temperature of from 250 degree to 380 degree C. while allowing said reaction mass to foam;
cooling said reaction mass to between 35° C. to 15° C. to a friable foamed mass;
crushing said friable foamed mass to obtain a ground prepolymer; and starting the second stage which comprises the steps of:
providing a reaction vessel having a means for agitation and a means for controlling pressure or vacuum;
transferring said ground prepolymer to said reaction vessel;
heating said ground prepolymer under agitation to between 330° to 350° C. at a slight positive pressure for a time between 200 minutes and 360 minutes; and
producing a polybenzimidazole having an average inherent viscosity of at least 0.7 dL/g for all particles in the size range of greater than or equal to 150 microns and smaller than or equal to 1000 micron8 and a plugging value greater than or equal to 10 g/cm².

17. The process for a two stage melt polymerization for the production of polybenzimidazole according to claim 16 where, in the second stage, said slight positive pressure is equal to or between 0.25 inches of $H_2O$ to 5 inches of $H_2O$ or 0.63 cm of $H_2O$ to 13 cm of $H_2O$.

18. The process for a two stage melt polymerization for the production of polybenzimidazole according to claim 16 where, in the second stage, where said second reaction vessel is a high intensity reaction vessel.

19. The process for a two stage melt polymerization for the production of polybenzimidazole according to claim 16 where said aromatic tetraamne is 3,3'4, 4'-tetraaminobiphenyl.

20. The process for a two stage melt polymerization for the production of polybenzimidazole according to claim 16 where said dicarboxylic component is a diphenyl isophthalate.

21. The process for a two stage melt polymerization for the production of polybenzimidazole according to claim 1 where said high intensity reaction vessel is selected from the group consisting of: rotary furnace, fluidizeci bed, static mixing, agitated autoclave, agitated glassware, continuous kneader reactor, opposite rotating processor, same direction rotating processors and single shaft rotating processor.

* * * * *